(12) United States Patent
Kamiya

(10) Patent No.: US 6,438,138 B1
(45) Date of Patent: Aug. 20, 2002

(54) BUFFER CONTROLLER INCORPORATED IN ASYNCHRONOUS TRANSFER MODE NETWORK FOR CHANGING TRANSMISSION CELL RATE DEPENDING ON DURATION OF CONGESTION AND METHOD FOR CONTROLLING THEREOF

(75) Inventor: Satoshi Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/164,599

(22) Filed: Oct. 1, 1998

(30) Foreign Application Priority Data

Oct. 1, 1997 (JP) .............................. 9-269049

(51) Int. Cl.[7] .............................. H04J 3/16; H04J 3/22
(52) U.S. Cl. .................... 370/468; 370/395.1; 370/232; 370/428
(58) Field of Search ................................ 370/229, 230, 370/231, 232, 233, 234, 235, 236, 289, 395, 400, 395.4, 395.42, 395.43, 412, 413, 428, 429, 465, 468

(56) References Cited

U.S. PATENT DOCUMENTS

| | | | |
|---|---|---|---|
| 5,719,853 A | | 2/1998 | Ikeda |
| 5,737,313 A | | 4/1998 | Kolarov et al. |
| 5,745,477 A | * | 4/1998 | Zheng et al. ............... 370/230 |
| 5,864,538 A | * | 1/1999 | Chong et al. ............... 370/235 |
| 5,914,936 A | * | 6/1999 | Hatono et al. ............. 370/230 |
| 5,940,375 A | * | 8/1999 | Soumiya et al. ........... 370/249 |
| 6,094,418 A | * | 7/2000 | Soumiya et al. ........... 370/231 |
| 6,137,779 A | * | 10/2000 | Miller et al. ................ 370/236 |
| 6,141,321 A | * | 10/2000 | Lee ............................. 370/229 |
| 6,144,636 A | * | 11/2000 | Aimoto et al. ............. 370/229 |

FOREIGN PATENT DOCUMENTS

| | | |
|---|---|---|
| EP | 0 661 851 | 7/1995 |
| JP | A-63-193640 | 8/1988 |
| JP | A-2-266730 | 10/1990 |
| JP | A-4-79448 | 3/1992 |
| JP | A-6-30019 | 2/1994 |
| JP | 6-30019 | 2/1994 |
| JP | A-7-95212 | 4/1995 |
| JP | 7-95212 | 4/1995 |
| JP | 7-183886 | 7/1995 |
| JP | A-7-183886 | 7/1995 |
| JP | 8-223174 | 8/1996 |
| JP | A-8-223174 | 8/1996 |
| JP | A-9-247181 | 9/1997 |
| JP | A-10-4419 | 1/1998 |
| JP | A-10-164084 | 6/1998 |
| JP | A-10-303933 | 11/1998 |
| JP | A-10-308750 | 11/1998 |
| WO | 95-19077 | 7/1995 |

OTHER PUBLICATIONS

"The ATM Forum Technical Committee"; Traffic Management Specification; Version 4.0; Apr. 1996 pp. 1–100.

M. Shinohara et al., *Large Scale ATM Switch with Multiple QoS Guarantee*, Institute of Electronics, Information and Communication Engineers Research Report SSE96–55, pp. 73–78.

* cited by examiner

Primary Examiner—David Vincent
Assistant Examiner—Bob A. Phunkulh
(74) Attorney, Agent, or Firm—Foley & Lardner

(57) ABSTRACT

An asynchronous transfer mode network has a controller for a buffer where asynchronous transfer mode cells successively enter into a queue formed therein, and the controller determines a degree of congestion status on the basis of the length of queue and a lapse of time after the length exceeds the least threshold of the length so as to change a transmission cell rate.

28 Claims, 9 Drawing Sheets

BUFFER CONTROLLER INCORPORATED IN ASYNCHRONOUS TRANSFER MODE NETWORK FOR CHANGING TRANSMISSION CELL RATE DEPENDING ON DURATION OF CONGESTION AND METHOD FOR CONTROLLING THEREOF

FIELD OF THE INVENTION

This invention relates to an asynchronous transfer mode network and, more particularly, to a buffer controller for an available bit rate service in the asynchronous transfer mode network and a method for controlling thereof.

DESCRIPTION OF THE RELATED ART

An available bit rate service is proposed for an asynchronous transfer mode in ATM (Asynchronous Transfer Mode) Forum Traffic Management Specification version 4.0, 1996. An Allowable cell rate means the transmission cell rate at a terminal, and is dynamically changed depending upon the status of the network. The cell transmission rate is managed through a feedback control in the available bit rate service, and the feedback control reduces the cells to be disposed. Thus, the available bit rate service aims at provision of equal right to occupy each part of the network between users.

The available bit rate service is detailed hereinbelow. In the following description, term "terminal" is applied to not only actual terminals for the users but also virtual transmission terminals and virtual receiving terminals such as a virtual source and a virtual destination defined in the ATM Forum Traffic Management Specification version 4.0.

FIG. 1 illustrates the prior art asynchronous transfer mode network 1. A switching unit 2 is incorporated in the prior art asynchronous transfer mode network 1, and terminals 3/4 are connected to the asynchronous transfer mode network 1. The terminal 3 and the terminal 4 are assumed to be a data source and a data destination, respectively. When the terminal 3 transmits data to the terminal 5, the terminal 3 firstly transmits a forward resource management cell, which is abbreviated as "FRM" in FIG. 1, to the switching unit 2, and the switching unit 2 transfers the forward resource management cell FRM to the terminal 4. When the terminal 4 receives the forward resource management cell FRM, the terminal 4 returns a backward resource management cell, which is abbreviated as "BRM" in FIG. 1, through the switching unit 2 to the terminal 3. The switching unit 2 has pieces of status data information representative of the congestion of the network 1, and writes control bits ER, a congestion indication bit CI and a no increase bit NI in the forward resource management cell FRM or the backward resource management cell BRM. The control bits ER are representative of an explicit rate, and the explicit rate is determined on the basis of the current status of the network 1. The congestion indication bit CI indicates whether the network is in congestion status or not, and the no increase bit NI indicates whether the terminal 3/4 is allowed to increase the transmission rate or not. The congestion indication bit CI is changed between "1" indicative of congestion status and "0" indicative of non-congestion status. The no increase bit NI is also changed between "1" indicative of prohibition from increase of transmission rate and "0" indicative of permission to increase the transmission rate. The terminal 3 maintains or changes the transmission rate of data cells on the basis of the control bits, the congestion indication bit and the no increase bit NI written in the backward resource management cell BRM, and transmits data cells through the switching unit 2 to the terminal 4 at the data transmission rate. Thus, the terminals 3/4 carry out the data transmission under the control of the switching unit.

As described hereinbefore, a virtual source and a virtual destination are defined for the available bit rate service. The virtual source and the virtual destination are located in the asynchronous transfer mode network, and virtually behave as the terminals. In other words, the virtual source and the virtual destination virtually process the forward resource management cell FRM and the backward resource management cell BRM, and divide the transmission control loop for the forward/backward resource management cells into segments. The division into the segments is desirable, because the segments accelerate the transmission of the control data information. The acceleration of the transmission results in improvement of the rate controlling characteristics in the terminal 3.

FIG. 2 illustrates another prior art asynchronous transfer mode network for the available bit rate service, and the prior art asynchronous transfer mode network 10 provides a data transmission control loop between terminals 11/12. In the following description, a combination of the virtual source VS and the virtual destination VD is referred to as "virtual terminal module", and a position closer to a transmission terminal and another position closer to a receiving terminal are called as "upstream side" and "downstream side", respectively.

Two virtual terminal modules 13/14 are inserted into the transmission control loop, and divide the data transmission control loop into segments 15a/15b/15c. The terminal 11 communicates with the virtual terminal module 14, and a forward resource management cell FRM1 and a backward resource management cell BRMI are used for the transmission control therebetween. The virtual terminal modules 13 and 14 communicate with each other by using a forward resource management cell FRM2 and a backward resource management cell BRM2. The virtual terminal module 14 communicates with the terminal 12, and a forward resource management cell FRM3 and a backward resource management cell BRM3 are used for the transmission control therebetween. The data transmission is carried out from the terminal 11 through the virtual terminal modules 13/14 to the terminal 12, and the data transmission rate is varied between the segments 15a/15b/15c.

In the prior art asynchronous transfer mode networks 1/10, burst traffic from multiple terminals, variation of area available for the data transmission and variation of transmission rate due to congestion at a terminal cause the switching unit 2 and the virtual terminal module 13/14 to pile up a large amount of data cells to be transferred. Cell buffers are provided in the switching unit 2 and the virtual terminal module 13/14 so as to temporarily store the data cells. When the data cells are piled up in the cell buffer, the switching unit and the virtual terminal module enter into congestion status. Therefore, the prior art asynchronous transfer mode networks 1/10 require a buffer controller for prohibiting the cell buffer from the congestion status.

Japanese Patent Publication of Unexamined Application No. 8-223174 teaches a controller for the cell buffers. According to the Japanese Patent Publication of Unexamined Application, the congestion detector monitors the buffer memory to see how many asynchronous transfer mode cells enter into a queue. When the queue reaches a predetermined length or an asynchronous transfer mode cell overflows the buffer memory, the controller determines that the asynchronous transfer mode network has entered into congestion status, and notifies plural paths selected from a connection table. Thus, the criterion is the queue length or the number of asynchronous transfer mode cells stored in the buffer memory Another method for controlling congestion status is disclosed in Japanese Patent Publication of Unexamined Application No. 7-183886. According to the Japanese Patent Publication of Unexamined Application, two pairs of thresholds, i.e., four thresholds, are given to the buffer in each node, and the buffer is monitored to see whether or not the queue reaches any one of the thresholds. The first pair of thresholds offer a boundary for notification of the congestion status to a receiving terminal and a boundary for the recovery therefrom. The second pair of thresholds offer a boundary for an interruption of cell transfer from a transmitting terminal and a boundary for a recovery therefrom. Thus, the queue length or the number of asynchronous transfer mode cells is the criteria of the congestion status.

Yet another congestion controlling method is disclosed in Japanese Patent Publication of Unexamined Application No. 7-95212. According to the Japanese Patent Publication of Unexamined Application, either high or low priority is given to each asynchronous transfer mode cell. When the queue in the first-in first-out buffer reaches a predetermined length, the low-priority asynchronous transfer mode cell is discarded. The criterion for the congestion status is the queue length or the number of asynchronous transfer mode cells stored in the first-in first-out buffer.

Still another congestion controlling method is disclosed in Japanese Patent Publication of Unexamined Application No. 6-30019. The load manager monitors the common buffer memory to see whether the maximum number of asynchronous transfer mode cells exceeds a predetermined threshold or not. When the maximum number exceeds the threshold, the load manager recognizes the congestion status. Thus, the criterion for the congestion status is the queue length or the number of asynchronous transfer mode cells stored in the common buffer memory.

Various calculating methods for the transmission cell rate have been proposed for the switch for the available bit rate service, and the ATM Forum Traffic Management Specification Version 4.0 proposes one example. However, the controlling characteristics for the congestion status are different between the proposed calculating methods. Promptitude of the rate change in transition period, an amplitude of oscillation in the rate change in stable state and the processing speed for the queue in the buffer are examples of the controlling characteristics. Only one calculating method is employed in the prior art switching unit 2, and the transmission cell rate is unitarily determined through the method regardless of degree of the congestion and duration of the congestion status.

As described hereinbefore, the queue length is compared with a threshold in the prior art controlling methods so as to determine congestion status. A problem is encountered in the prior art controlling methods when the transmission cell rate is too small for the channel to quickly recover from the congestion status. In detail, when a channel enters congestion status, the transmission cell rate is reduced to a predetermined value. If the queue length is close to the threshold after entry into congestion status, the predetermined transmission cell rate is too small for the channel to quickly recover from congestion status. Furthermore, if a transmission terminal completes the transmission of asynchronous transfer mode cells to the buffer at a queue length that slightly exceeds the threshold, the prior art controller notifies the transmission terminal of the congestion status so as to reduce the transmission cell rate. Although the channel gradually recovers from congestion status, the transmission terminal restarts the transmission of asynchronous transfer mode cells at the reduced transmission cell rate.

Another problem is unexpected overflow of asynchronous transfer mode cells. The buffer is assumed to increase and decrease the queue to be slightly below the threshold for a long time. The prior art controller does not notify the transmission terminal of the congestion status, and keeps the transmission cell rate constant. In this situation, if burst traffic takes place, the buffer can not store all the asynchronous transfer mode cells, and part of the asynchronous transfer mode cells overflow the buffer. Thus, the prior art controllers can not achieve a low cell loss ratio in spite of the available bit rate service.

Yet another problem is encountered in the prior art shared buffer type controlling system in unevenness between virtual connections. In this instance, virtual queues are formed at the virtual connections. There is a possibility that a certain virtual connection occupies the whole common buffer. In this situation, asynchronous transfer mode cells are liable to overflow the buffer at another virtual connection. The overflow causes loss of cells. Otherwise, the transmission cell rate is drastically reduced so as to prevent the asynchronous transfer mode cells from overflow. Thus, unevenness takes place between the virtual connections.

SUMMARY OF THE INVENTION

It is therefore an important object of the present invention to provide a controller, which makes an asynchronous transfer mode network achieve a high throughput without sacrifice of the cell loss ratio.

It is also an important object of the present invention to provide a method of controlling an available bit rate service for a high throughput without sacrifice of the cell loss ratio.

To accomplish the object, the present invention proposes to change a transmission cell rate depending upon a lapse of time from entry into congestion status.

In accordance with one aspect of the present invention, there is provided a buffer controller operative to transfer data cells from a transmitting terminal to a receiving terminal both incorporated in an asynchronous transfer mode network for an available bit rate service comprising a cell buffer for temporarily storing at least one queue of the cells, a judging means for determining a current degree of congestion status in the cell buffer on the basis of a lapse of time after entry into the congestion status and said length of the at least one queue, a calculating means for calculating transmission cell rates different from one another through different algorithms, and a selecting means responsive to a control signal representative of the current degree of congestion status so as to cause the calculating means to supply one of the transmission cell rates to the transmission terminal.

In accordance with another aspect of the present invention, there is provided a method of controlling a cell transmission from a transmitting terminal to a receiving terminal both incorporated in an asynchronous transfer mode network for an available bit rate service, comprising the steps of checking a queue of cells to see whether or not a queue length is indicative of congestion status, counting a lapse of time after entry into the congestion status, determining a current degree of the congestion status on the basis of the queue length and the lapse of time, changing a transmission cell rate to a value appropriate to the current degree of congestion status, and notifying the transmitting terminal of the value of the transmission cell rate so as to vary the amount of the cells supplied from the transmitting terminal per unit time.

BRIEF DESCRIPTION OF THE DRAWINGS

The features and advantages of the controller and the method will be more clearly understood from the following description taken in conjunction with the accompanying drawings in which.

DESCRIPTION OF THE PREFERRED EMBODIMENTS

First Embodiment

Figure 1:
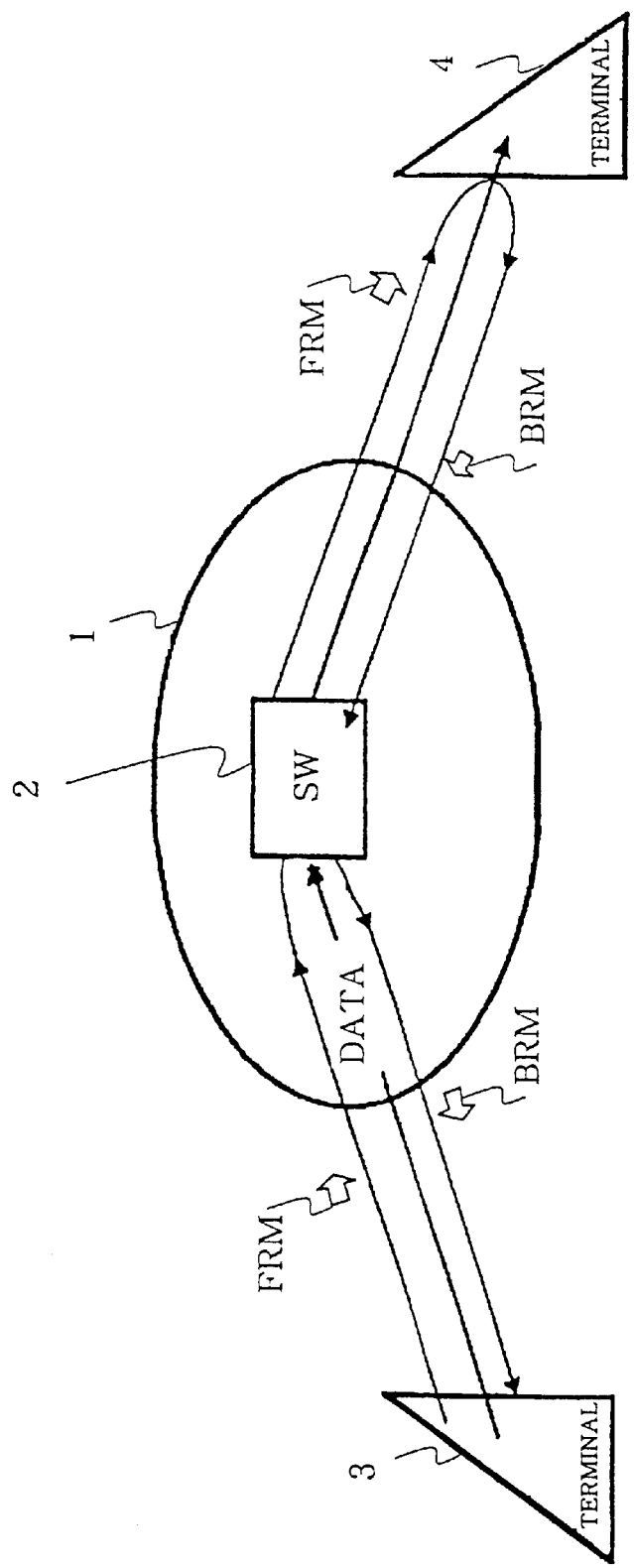
FIG. 1 is a schematic view showing the prior art asynchronous transfer mode network for the available bit rate service.
Figure 2:
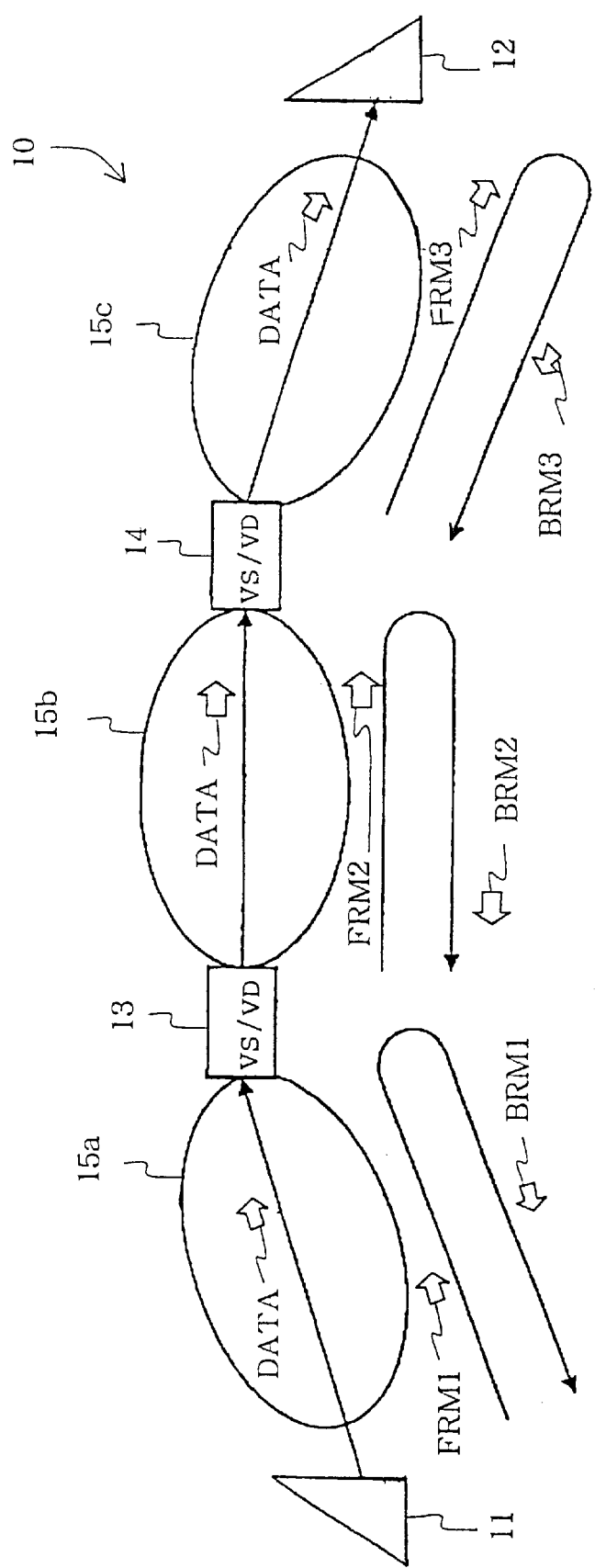
FIG. 2 is a block diagram showing the prior art asynchronous transfer mode network with the data transmission control loop divided into the segments.
Figure 3:
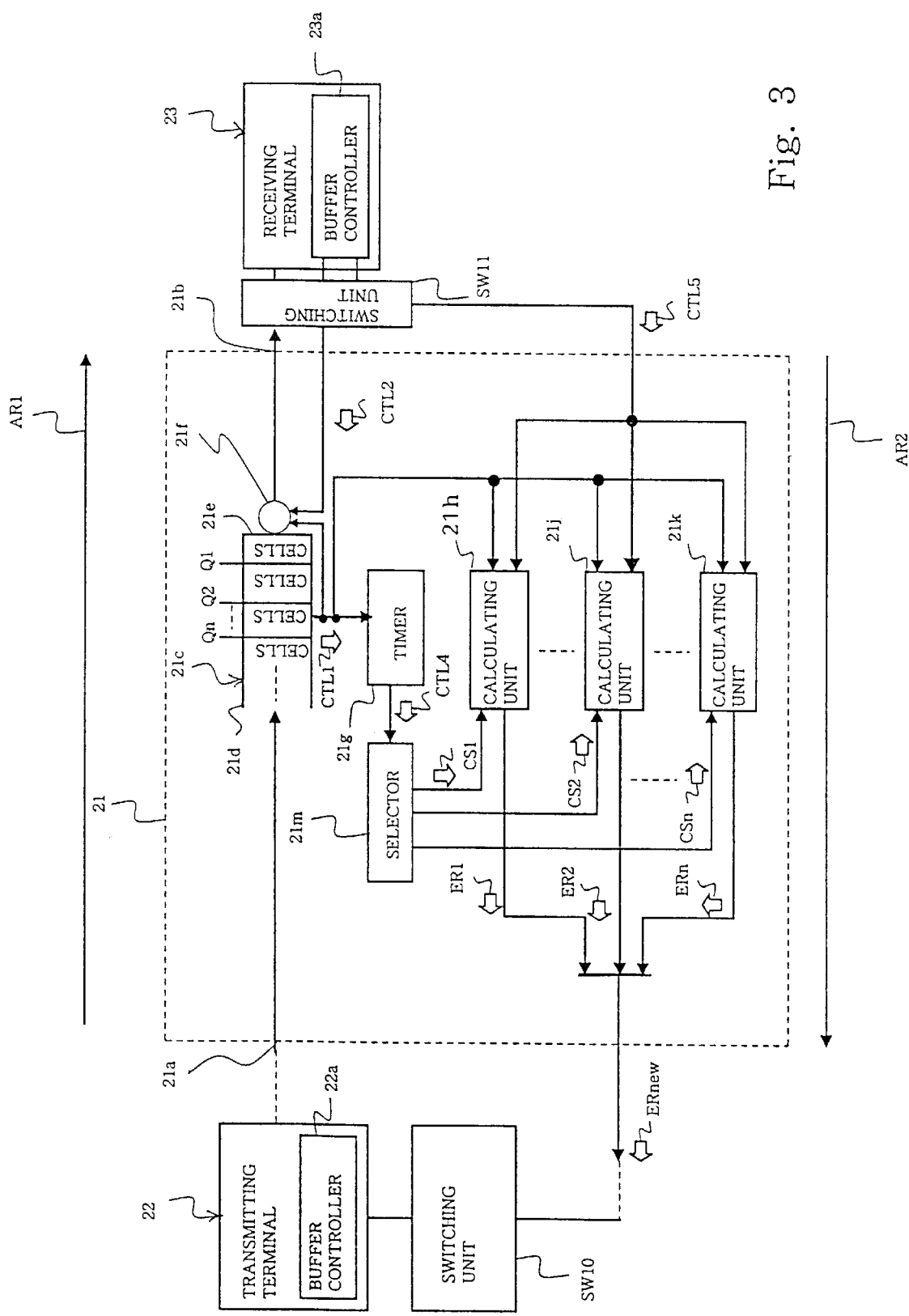
FIG. 3 is a block diagram showing the circuit arrangement of a buffer controller according to the present invention.

Referring to FIG. 3 of the drawings, a buffer controller 21 embodying the present invention is connected between a transmitting terminal 22 and a receiving terminal 23. Switching units SW10 and SW11 are inserted between the buffer controller 21 and the transmitting/receiving terminals 22/23 in the available bit rate service. Arrow AR1 is indicative of a direction from the transmitting terminal 22 toward the receiving terminal 23, and is referred to as "forward direction". On the other hand, arrow AR2 is indicative of the opposite direction to the forward direction, and is referred to as "backward direction".

The buffer controller 21 includes an input port 21a connected to the transmitting terminal 22, an output port 21b connected to the receiving terminal 23 and a cell buffer 21c connected between the input port 21a and the output port 21b. The cell buffer 21c has an input port 21d connected to the input port 21a and an output port 21e connected to the output port 21b. Asynchronous transfer mode cells are supplied from the transmitting terminal 22 to the cell buffer 21c, and are accumulated in the cell buffer 21c from a storage region closest to the output port 21b toward a storage region farthest from the output port 21b. Therefore, the first asynchronous transfer mode cell is stored in the storage region closest to the output port 21b, and the last asynchronous transfer mode cell is stored in a storage region closer to the input port 21d than the storage regions occupied by the asynchronous transfer mode cells. The first asynchronous transfer mode cell is firstly output from the storage region to the output port 21e. Thus, the cell buffer 21c has a first-in first-out buffer, and the cells form queues for virtual connections in the first-in first-out buffer. The queue varies in length from the memory region closest to the output port 21e, and the cell buffer 21c produces a control data signal CTL1 representative of the queue length for each virtual connection and, accordingly, the piece of internal congestion status.

The buffer controller 21 further includes an output rate controlling unit 21f provided for the output port 21e, a timer 21g connected to the cell buffer 21c, multiple calculating units 21h/21j/21k connected to the cell buffer 21c and an external information source such as a buffer controller 23a and a selector 21m connected to the timer 21g and the calculating units 21h to The output rate controlling unit 21f takes the piece of internal congestion status information represented by the control data signal CTL1 and pieces of network congestion status information represented by another control data signal CTL2 into account so as to vary a transmission cell rate. The control data signal CTL2 is supplied to the output rate controlling unit 21f in the form of the backward resource management cell. Although the backward resource management cell is supplied from the receiving terminal 23, it contains the pieces of network congestion status information reported from the switching unit SW11 and other switching units (not shown).

The timer 21g stores multiple thresholds Q1, Q2 ... and Qn for the queue length and a threshold Tth for excess times. The multiple thresholds Q1 to Qn are representative of degrees of the congestion status. The threshold Q2 is greater than the threshold Q1 and less than the threshold Qn, and the thresholds Q1 to Qn relate to the calculating units 21h, 21j ... and 21k, respectively. The timer 21g compares the queue length for each virtual connection with the thresholds Q1/Q2/Qn to see whether the queue length exceeds the thresholds Q1/Q2/Qn or not. When the queue length exceeds the thresholds Q1/Q2/Qn, the timer 21g starts to count excess times at the thresholds Q1/Q2/Qn. The excess times from the thresholds Q1/Q2/Qn are expressed by T1, T2, and Tn, respectively. In this instance, the threshold Tth is common to the excess times T1/T2/Tn. The timer 21g compares the excess times T1/T2/Tn with the threshold Tth to see whether the excess times T1/T2/Tn go over the threshold Tth or not. When the excess times T1/T2/Tn exceed the threshold Tth, the timer 21g produces a control signal CTL4 representative of the excess over the threshold Tth, and supplies the control signal CTL4 to the selector 21m. While the queue is being shortened, the timer 21g produces the control signal CTL4 at each of the thresholds Q1 to Qn. Therefore, the control signal CTL4 further represents decrease to each threshold Q1–Qn.

The calculating units 21h/21j/21k have respective algorithms for calculating the transmission cell rate, and the algorithms are different from one another. The control signal CTL1 is supplied to the calculating units 21h/21j/21k, and a control data signal CTL5 is further supplied from the buffer controller 23a to the calculating units 21h/21j/21k. The control data signal CTL5 is representative of pieces of data information used for calculation of the transmission cell rate. The calculating units 21h/21j/21k calculate the transmission cell rate through the algorithms, and produce control data signals ER1, ER2, . . . and ERn representative of the values of the transmission cell rate or the explicit rate, respectively. When the calculating units 21h to 21k calculate the transmission cell rate on the basis of the same queue length and the same pieces of data information, the value of the transmission cell rate is decreased in the order from the control data signal ER1 toward the control data signal ERn. In the following description, the calculating units 21h and 21j are respectively referred to as "first calculating unit" and "second calculating unit", and the calculating unit 21k is referred to as "n-th calculating unit".

The selector 21m is responsive to the control data signal CTL4 so as to determine what calculating unit 21h to 21k is the most adequate to calculate the transmission cell rate. The selector 21m produces selecting signals CS1, CS2, . . . and CSn representative of change from one calculating unit to another, and supplies the selecting signals CS1 to CSn to the calculating units 21h to 21k, respectively. The control data signal ER1/ER2/ERn from the selected calculating unit is supplied to the buffer controller 22a of the transmitting terminal 22 as a control data signal ERnew representative of an explicit rate.

Description is hereinbelow made on the behavior of the buffer controller 21 on the assumption that the k-th calculating unit is supplying the control data signal ERnew to the buffer controller 22a. Though not shown in FIG. 3, the k-th calculating unit is located between the calculating unit 21j and the calculating unit 21k, and a selecting signal CSk is supplied from the selector 21m to the k-th calculating unit. A threshold Qk is corresponding to the k-th calculating unit, and an excess time Tk represents the lapse of time from the threshold Qk.

The transmitting terminal 22 is successively supplying asynchronous transfer mode cells to the cell buffer 21c, and the asynchronous transfer mode cells are accumulated therein. The asynchronous transfer mode cells enter into the queue, and increase the queue length Q. The cell buffer 21c notifies the timer 21g of the queue length Q through the control data signal CTL1. When the queue length Q exceeds the threshold Qk, the timer starts the count, and increments the excess time Tk.

When the excess time Tk goes over the threshold Tth, the timer supplies the control signal CTL4 representative of the excess over the threshold Tth to the selector 21m, and the selector changes the selecting signal CSk to inactive level and the selecting signal CSk+1 to active level. The selecting signal CSk+1 makes the (k+1)-th calculating unit supply the control data signal ERnew to the buffer controller 22a. As a result, the transmission cell rate is reduced, and the queue length Q in the cell buffer 21c becomes shorter. When the queue length Q is decreased to the threshold Qk, the timer supplies the control signal CTL representative of the decrease to the threshold Qk, and the selector 21m changes the selecting signal CSk+1 to the inactive level and the selecting signal CSk to the active level. As a result, the control data signal ERnew is supplied from the k-th calculating unit instead of the (k+1)-th calculating unit.

On the other hand, even after the k-th calculating unit is changed to the (k+1)-th calculating unit, the asynchronous transfer mode cells still make the queue longer. When the queue length Q exceeds the threshold Qk+1, the timer 21g starts to count the excess time Tk+1, again, and increment the excess time Tk+1. When the excess Tk+1 time reaches the threshold Tth, the timer 21g supplies the control signal CTL4 representative of the excess over the threshold Qk+1 to the selector 21m. Then, the selector 21m changes the selecting signal CSk+1 to the inactive level and the selecting signal CSk+2 to the active level. As a result, the (k+2)-th calculating unit supplies the control data signal ERnew to the buffer controller 22a.

Figure 4:
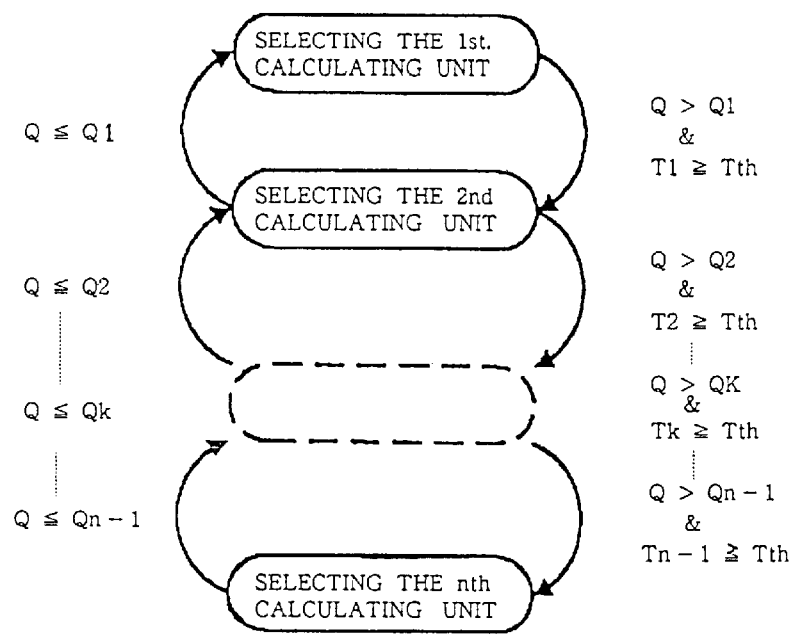
FIG. 4 is a view showing the control sequence for calculating a transmission cell rate carried out in the buffer controller.

As will be understood, the buffer controller 21 sequentially changes the calculating unit as indicated by arrows shown in FIG. 4, and the transmission cell rate is varied depending upon the lapse of time after entry into the congestion status. When the congestion status is light, the transmission rate is slightly reduced, and the asynchronous transfer mode network keeps the throughput relatively high. On the other hand, if the congestion status is serious, the transmission rate is stepwise decreased, and the cell buffer 21c is prevented from overflowing.

The calculating units 21h to 21k employ different algorithms for calculating the transmission cell rates, and the algorithms are adopted to force the queue length to the associated thresholds Q1 to Qn. This results in the control data signal ERnew being effective against the congestion status in the available bit rate service.

In the cell buffer 21c, the asynchronous transfer mode cells are managed for each of the virtual connections. Even if a queue for a virtual connection enters into the congestion status, the transmission cell rate is stepwise increased together with the lapse of time, and the queue quickly recovers from the congestion status. For this reason, the cell buffer 21c is quickly released from the virtual connection, and the cell buffer 21c is evenly shared between the virtual connections.

Finally, the selector 21m selectively activates the calculating units 21h to 21k. This means that non-selected calculating units do not calculate the transmission rate. Thus, only one calculating unit is working for the transmission cell rate, and the electric power is saved.

Second Embodiment

Figure 5:
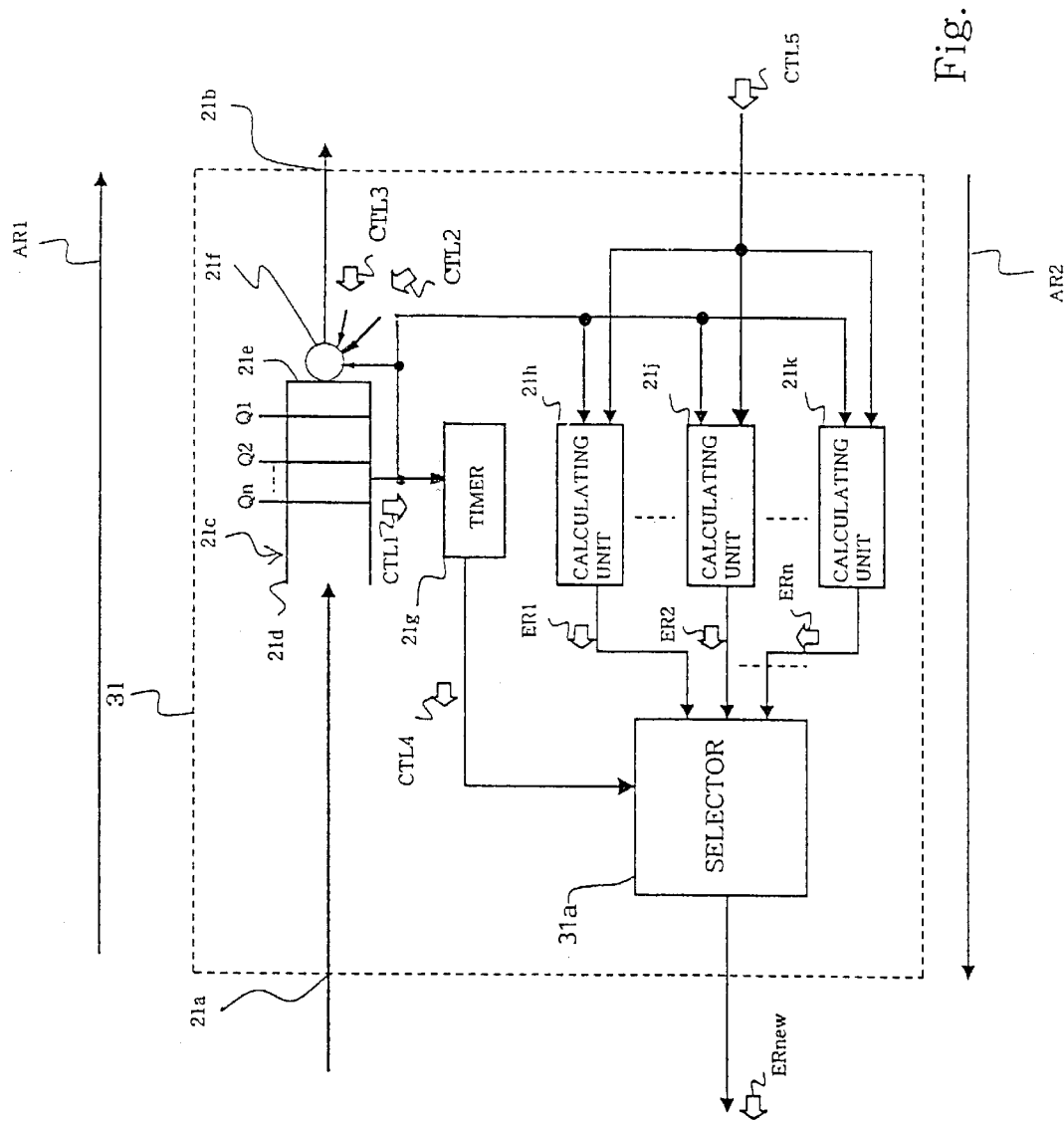
FIG. 5 is a block diagram showing the circuit arrangement of another buffer controller according to the present invention.

FIG. 5 illustrates another buffer controller 31 embodying the present invention. The components of the buffer controller 31 are similar to those of the buffer controller 21 except for a selector 31a. For this reason, the other components are labeled with the same reference numbers designating corresponding components of the buffer controller 21 without detailed description.

The calculating units 21h to 21k calculate the transmission cell rates at all times so as to vary the control data signals ER1 to ERn, and supply the control data signals ER1 to ERn to the selector 31a. For this reason, the selector 31a only selects one of the control data signals ER1 to ERn in response to the control signal CTL4. Although the electric power consumption is larger than that of the buffer controller 21, the buffer controller 31 changes the control data signal ERnew faster than the buffer controller 21.

Figure 6:
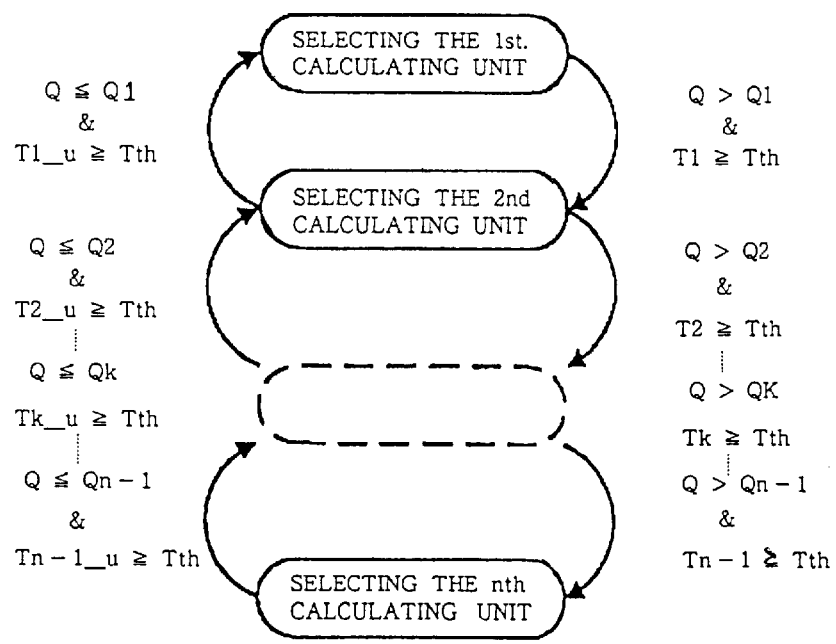
FIG. 6 is a view showing another control sequence for calculating a transmission cell rate carried out in both of the buffer controllers.

The buffer controller 31 changes the transmission cell rate as similar to the buffer controller 21 through the sequence shown in FIG. 4. Another control sequence shown in FIG. 6 is available for each of the buffer controllers 21/31. In control sequence shown in FIG. 6, when the buffer controller 21/31 increases the transmission cell rate, the timer 21g starts to count the excess time Tk at the threshold Qk, and the selector 21m/31a changes the calculating unit from the k-th calculating unit to the (k+1)-th calculating unit as similar to the control sequence shown in FIG. 4. However, the reduction of the transmission cell rate is different from that of the control sequence shown in FIG. 4. In detail, if the transmitting terminal 22 decreases the transmission cell rate, the queue length Q is shortened, and reaches the threshold Qk. However, the timer 21g does not immediately supply the control signal CTL4 representative of the arrival at the threshold Qk to the selector 21m/31a, but starts to count the excess time Tk_u. If the queue length Q does not exceed the threshold Qk again until the threshold Tth, the selector 21m/31a changes the calculating unit from (k+1)-th to k-th. The control sequence shown in FIG. 6 is hardly affected by a momentary increase of asynchronous transfer mode cells, and makes the transmission of the asynchronous transfer mode cells stable rather than the control sequence shown in FIG. 4.

Figure 7:
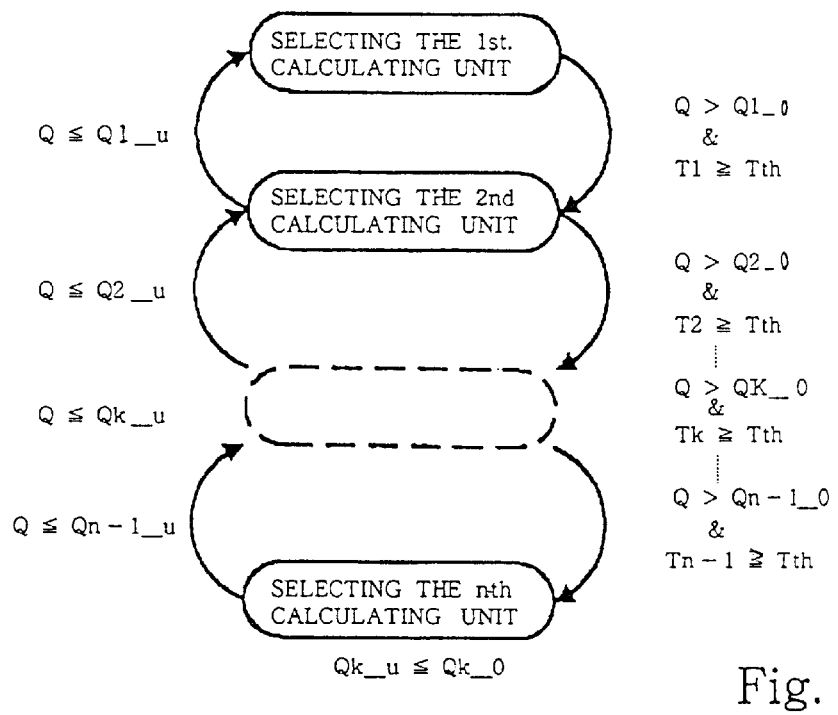
FIG. 7 is a view showing yet another control sequence for calculating a transmission cell rate carried out in both of the buffer controllers.

Yet another control sequence is shown in FIG. 7. The timer 21g has a first set of thresholds Q1_o to Qn−1_o and a second set of thresholds Qn−1_u to Q1_u. The thresholds Q1_o to Qn−1_o are greater than the corresponding thresholds Qn−1_u to Q1_u. The timer 21g uses the first set of thresholds Q1_o to Qn−1_o during the increase of the queue length Q and the second set of thresholds Qn−1_u to Q1_u during the decrease of the queue length Q. Thus, the two sets of thresholds Q1_o to Qn−1_o and Qn−1_u to Q1_u offers a hysteresis to the control sequence.

Assuming now that the buffer controller 21/31 controls the transmitting terminal 22 through the control sequence shown in FIG. 7, the asynchronous transfer mode cells make the queue long, and the queue length Q exceeds the threshold Qk_o. Then, the timer 21g starts to count the excess time Tk, and increments the excess time Tk. When the excess time Tk reaches the threshold Tth, the timer 21g supplies the control signal CTL4 to the selector 21m/31a, and the selector 21m/31a changes the k-th calculating unit to the (k+1)-th calculating unit so as to reduce the transmission cell rate.

On the other hand, while the asynchronous transfer mode cells is decreasing the queue length Q, the queue length Q reaches the threshold Qk_u smaller in value than the threshold Qk_o, and the selector 21m/31a changes the (k+1)th calculating unit to the k-th calculating unit.

Figure 8:
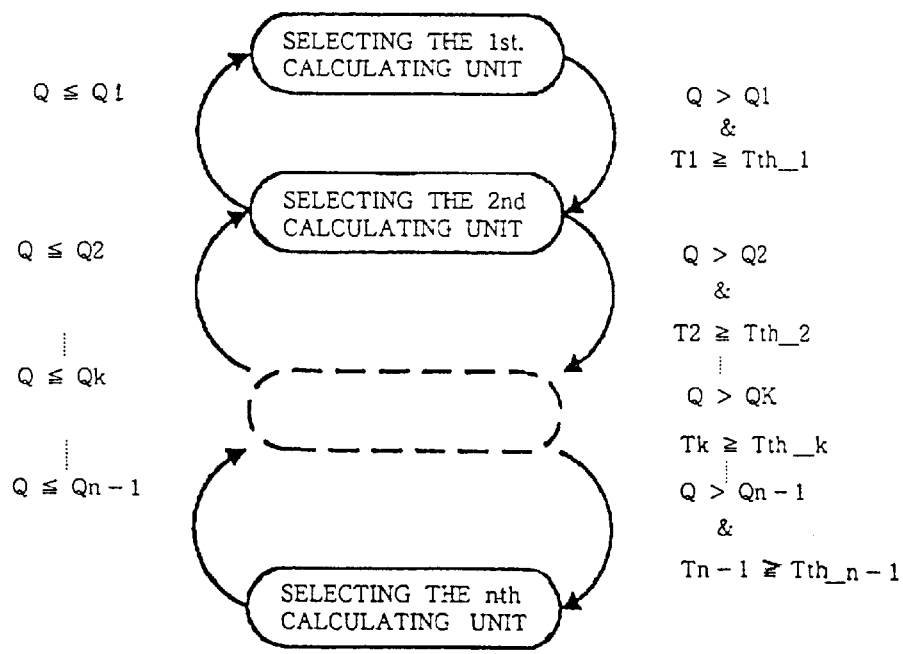
FIG. 8 is a view showing still another control sequence for calculating a transmission cell rate carried out in both of the buffer controllers.

Still another control sequence is available for the buffer controller 21/31, and is illustrated in FIG. 8. The control sequence shown in FIG. 8 uses variable threshold for lapse of time. While the asynchronous transfer mode cells are making the queue longer, the queue length Q exceeds the threshold Qk at a certain time. Then, the timer 21g starts to count the excess time Tk, and increments the excess time Tk. When the excess time Tk reaches the threshold Tth_k, the timer 21g supplies the control signal CTL4 to the selector 21m/31a, and the selector 21m/31a changes the k-th calculating unit to the (k+1)-th calculating unit so as to reduce the transmission cell rate.

On the other hand, while the asynchronous transfer mode cells is decreasing the queue length Q, the queue length Q reaches the threshold Qk, then the selector 21m/31a changes the (k+1)th calculating unit to the k-th calculating unit.

Figure 9:
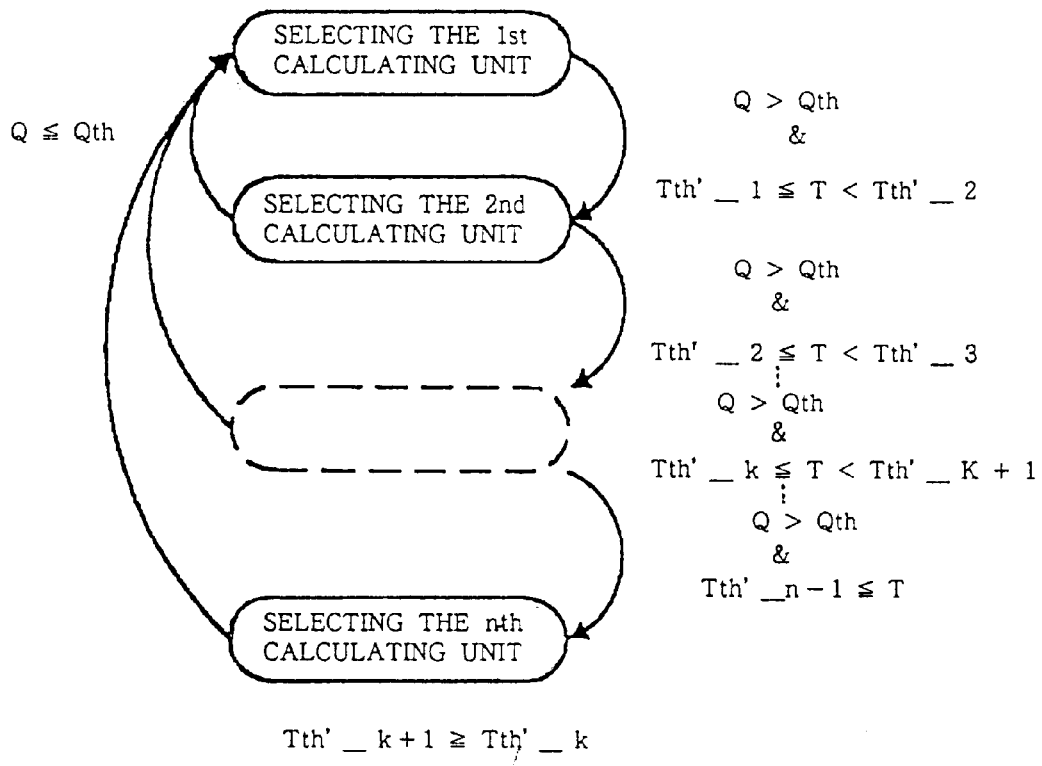
FIG. 9 is a view showing, another control sequence for calculating a transmission cell rate carried out in both of the buffer controllers.

FIG. 9 illustrates another control sequence available for the buffer controllers 21/31. In the control sequence shown in FIG. 9, the calculating unit 21h to 21k are sequentially changed depending upon the lapse of time after the excess over the threshold Qth. In other words, the timer 21g has only one threshold Qth for the queue length Q.

While the asynchronous transfer mode cells are increasing the queue, the queue length Q exceeds the threshold Qth at a certain timing. Then, the timer 21g starts to count the excess time T, and increments the excess time T. When the excess time T reaches the threshold Tth'_k, the timer 21g supplies the control signal CTL4 to the selector 21m/31a, and the selector 21m/31a changes the k-th calculating unit to the (k+1)-th calculating unit so as to reduce the transmission cell rate.

On the other hand, while the asynchronous transfer mode cells is decreasing the queue length Q, the queue length Q reaches the threshold Qth, then the selector 21m/31a changes the (k+1)th calculating unit to the first calculating unit.

Third Embodiment

Figure 10:
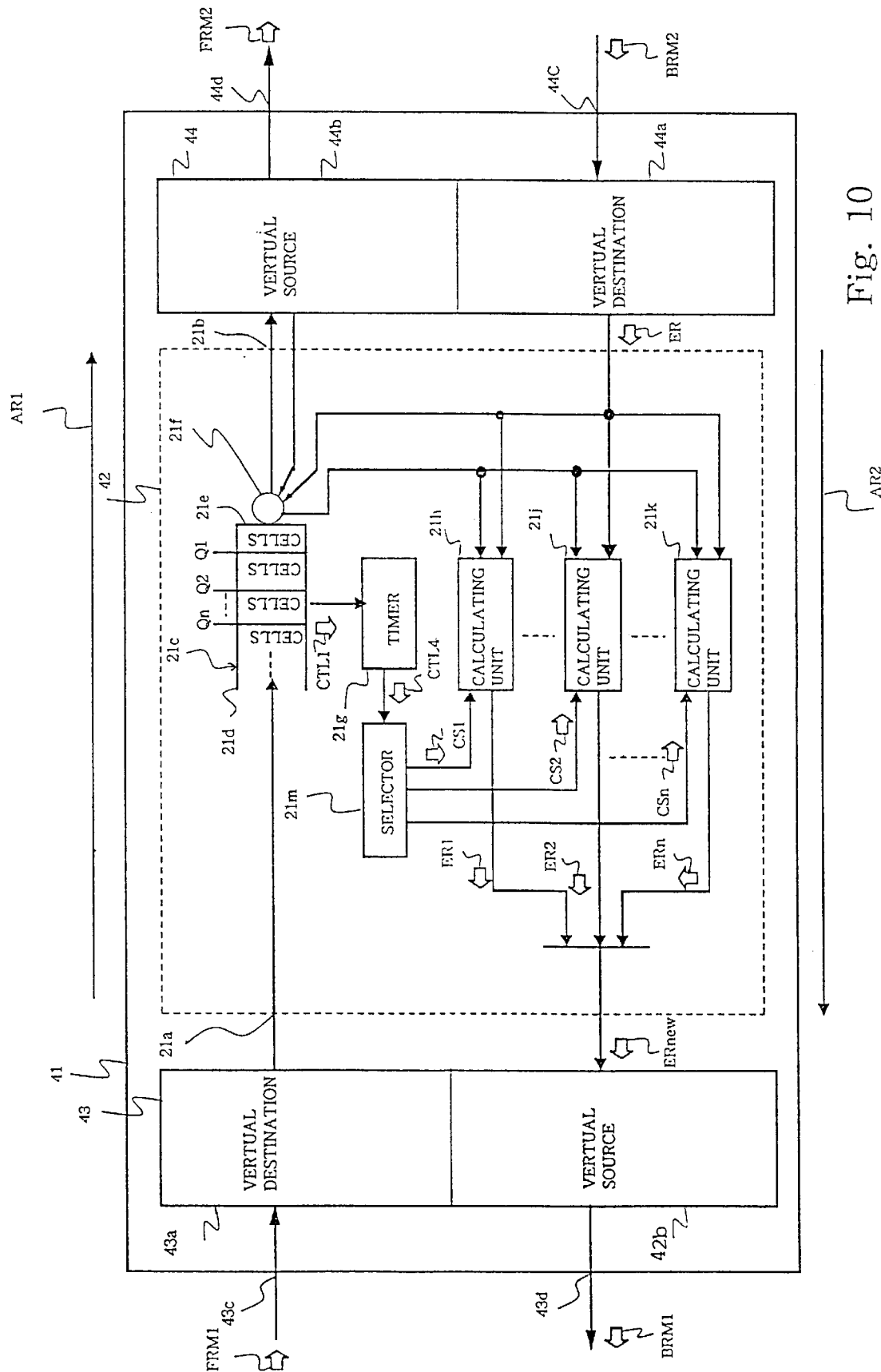
FIG. 10 is a block diagram showing the circuit arrangement of yet another buffer controller according to the present invention.

FIG. 10 illustrates a virtual terminal system 41 embodying the present invention. The virtual terminal system 41 largely comprises a buffer controller 42 and virtual terminal modules 43/44. The buffer controller 42 is similar in arrangement to the buffer controller 21, and components thereof are labeled with the same references designating corresponding components of the buffer controller 21. Asynchronous transfer mode cells form queues in the cell buffer 21c for respective virtual connections. Although FIG. 10 only shows the function blocks for a data transmission from a transmitting terminal to a receiving terminal, the virtual terminal system 41 symmetrically behaves between the data transmission terminal and the data receiving terminal, and has another set of function blocks for a data transmission from the receiving terminal to the transmission terminal.

The virtual terminal module 43 includes a virtual destination 43a and a virtual source 43b. The virtual destination 43a has an input port 43c, and receives forward resource management cells from the transmitting terminal. The virtual destination 43a transfers a data cell of each forward resource management cell FRM1 to the input port 21a. The virtual source 43b has an output port 43d, and transfers the control data signal BRM1 representative of a backward resource management cell to the transmitting terminal. Similarly, the virtual terminal module 44 includes a virtual destination 44a and a virtual source 44b. The virtual destination 44a has an input port 44c, and receives a backward resource management cell BRM2. The virtual destination 44a transfers a control data signal ER representative of an explicit rate to the calculating units 21h to 21k and the output rate controlling unit 21f. The virtual source 44b has an output port 44d, and transfers forward resource management cells FRM2 to a receiving terminal. Thus, the virtual destinations 43a/44a and the virtual sources 43b/44b are adopted to realize a destination behavior and a source behavior. The virtual destinations 43a/44a are respectively paired with the virtual sources 43b/44b, and the virtual terminal modules 43/44 virtually realize a terminal behavior during the available bit rate service. The terminal behavior is described in ATM Forum Traffic Management Specification Version 4.0.

The virtual terminal system 41 behaves as follows. When the transmitting terminal supplies a forward resource management cell FRM1 to the virtual destination 43a, the virtual destination 43a separates a data cell from the forward resource management cell FRM1, and transfers the data cell to the cell buffer 21c. The data cell enters into a queue formed in the cell buffer 21c.

The virtual destination 44a receives a backward resource management cell BRM2, and extracts the explicit rate from the backward resource management cell BRM2. The virtual destination 44a produces the control data signal ER representative of the explicit rate, and supplies the control data signal ER to the calculating units 21h to 21k and the output rate controlling unit 21f. The output rate controlling unit 21f determines an allowable cell rate on the basis of the explicit rate, and reads out the data cells from the cell buffer 21c at the allowable cell rate.

Selected one of the calculating units 21h to 21k calculates an explicit rate ERnew referred to as "transmission cell rate" in the description on the first embodiment on the basis of the allowable bit rate supplied from the output rate controlling unit 21f and the explicit rate ER supplied from the virtual destination 44a, and supplies the control data signal ERnew representative of the explicit rate to the virtual source 43b.

The virtual terminal module 43, i.e., the combination of the virtual destination 43a and the virtual source 43b receives the forward resource management cell FRM1 from the transmitting terminal, and stores the explicit rate represented by the control data signal ERnew in the backward resource management cell BRM1 so as to return the backward resource management cell BRM1 to the transmitting terminal.

Thus, the cell buffer 21c in the virtual terminal system 41 is controlled as similar to that of the first embodiment, and the virtual terminal system 41 achieves all the advantages of the first embodiment.

Fourth Embodiment

Figure 11:
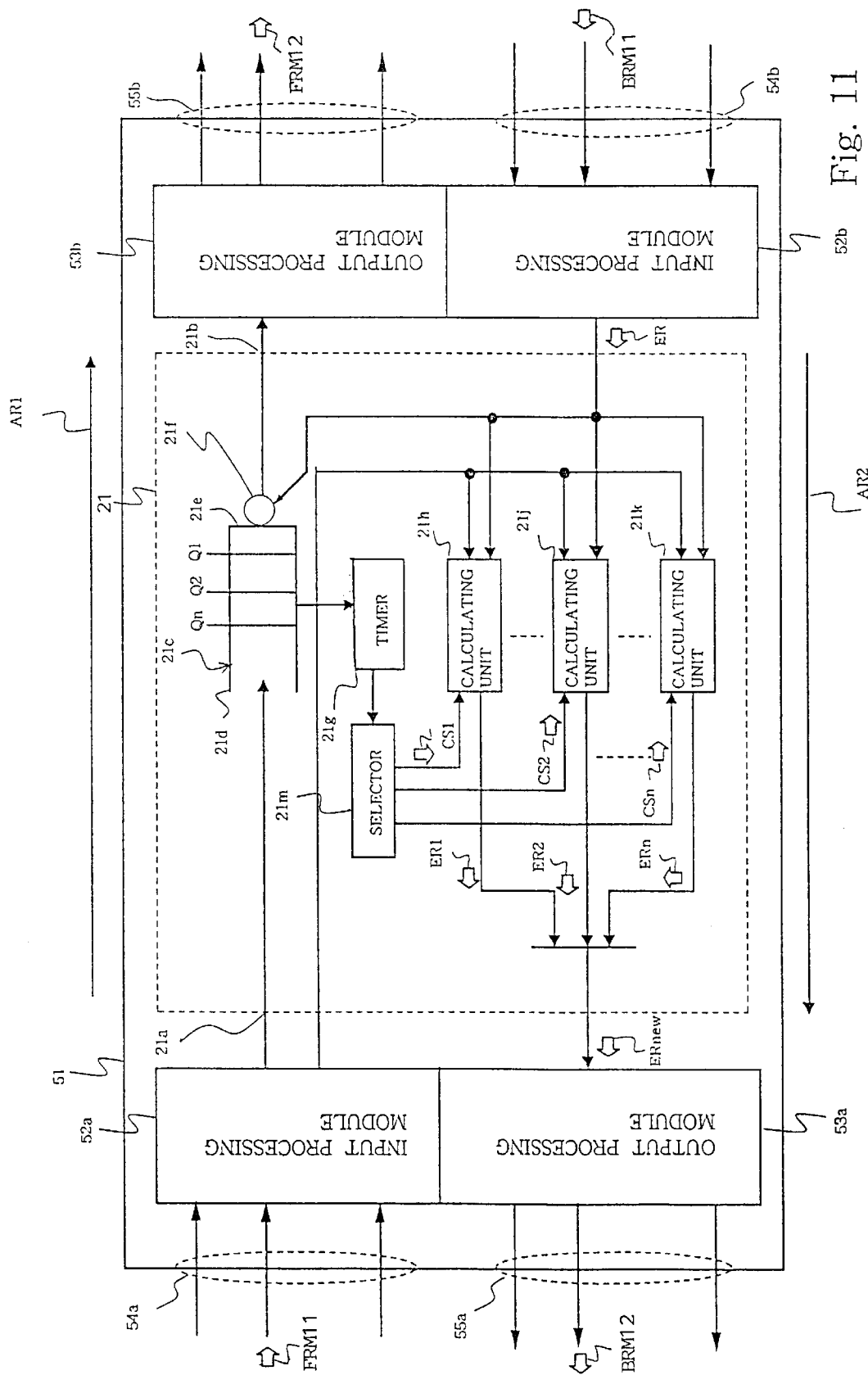
FIG. 11 is a block diagram showing the circuit arrangement of still another buffer controller according to the present invention.

FIG. 11 illustrates an asynchronous transfer mode switching unit 51 embodying the present invention for the available bit rate service. The buffer controller 21 is applied to the asynchronous transfer mode switching unit 51. The asynchronous transfer mode switching unit 51 largely comprises the buffer controller 21, input processing module 52a/52b and output processing modules 53a/53b. Although FIG. 11 only shows the function blocks for a data transmission from a transmitting terminal to a receiving terminal, the asynchronous transfer mode switching unit 51 symmetrically behaves between the data transmission terminal and the data receiving terminal, and has another set of function blocks for a data transmission from the receiving terminal to the transmission terminal.

Components of the buffer controller 21 incorporated in the switching unit 51 are similar to those of the first embodiment, and are labeled with the same references designating corresponding components of the buffer controller 21 implementing the first embodiment. Virtual queues are formed in the cell buffer 21c for respective virtual connections.

The input processing module 52a is connected between an input port 54a and the input port 21a, and the other input processing module 54b is connected between an input port 54b and the calculating units 21h to 21k. The output processing module 53a is connected between the calculating units 21h to 21k and an output port 55a, and the other output processing module 53b is connected between the output port 21b and an output port 55b. The input port 54a and the output port 55a are connected to a transmission terminal (not shown), and the other input port 54b and the other output port 55b are connected to a receiving terminal (not shown).

The input processing modules 52a/52b receive forward resource management cells FRM11 and backward resource management cells BRM11 from the input ports 54a/54b, and carry out an analysis of header and a discrimination of destination. On the other hand, the output processing modules 53a/53b carry out a read-out control for the cell stored in the cell buffer 21c and a change of contents in the fields of the forward/backward resource management cells assigned to the explicit rate, the congestion indication and the no increase.

The asynchronous transfer mode switching unit 51 for the available bit rate service makes the input processing module 52a analyze the header of the forward resource management cell FRM11 so as to store the forward resource management cell FRM11 in the cell buffer 21c. The output rate controlling unit 21f instructs the cell buffer 21c to successively transfer the forward resource management cells to the output processing module 53b.

In detail, when the forward resource management cell FRM11 arrives at the input processing module 52a, the input processing module 52a extracts the available cell rate and explicit rate from the forward resource management cell FRM11. The input processing module 52a supplies pieces of control data information representative of the available cell rate and the explicit rate to the calculating units 21h to 21k.

On the other hand, the input processing module 52b receives the backward resource management cell BRM11, and extracts the explicit rate from the backward resource management cell BRM11. The input processing module 52b produces a control data signal ER, and supplies it to the output rate controlling unit 21f and the calculating units 21h to 21k.

Selected one of the calculating units 21h to 21k calculates the explicit rate ERnew, and sends the explicit rate ERnew to the output processing unit 53a.

The output processing unit 53a stores the explicit rate ERnew in a field of the backward resource management cell BRM11, and supplies the backward resource management cell BRM11 to the transmitting terminal.

Thus, the cell buffer 21c is controlled as similar to that of the first embodiment, and all the advantages are achieved by the fourth embodiment.

As will be appreciated from the foregoing description, the buffer controller 21/31 checks the lapse of time after entry into the congestion status so as to determine the degree of congestion status, and changes the transmission cell rate depending upon the degree of congestion status. As a result, the buffer controller 21/31 achieves a high throughput without sacrifice of cell loss ratio.

The buffer controller 21/31 calculates the explicit rate, and supplies it to the transmitting terminal. For this reason,. the buffer controller 21/31 effectively controls the transmission cell rate in the available bit rate service.

If the queues are formed in the cell buffer for respective virtual connections, the buffer controller 21/31 quickly evacuates the asynchronous transfer mode cells from each queue, and any virtual connection does not continuously occupy the cell buffer 21c.

In the above described embodiments, the timer 21g serves as a judging means, and the calculating units 21h to 21k as a whole constitute a calculating means. The selector 21m/31a serves as the selecting means.

What is claimed is:

1. A buffer controller operative to transfer data cells from a transmitting terminal to a receiving terminal both incorporated in an asynchronous transfer mode network for an available bit rate service, comprising:

a cell buffer for temporarily storing at least one queue of said cells;

a judging means for determining a current degree of congestion status in said cell buffer on the basis of a lapse of time after entry into said congestion status and a length of said at least one queue;

a calculating means for calculating transmission cell rates different from one another through different algorithms; and a selecting means responsive to a control signal representative of said current degree of congestion status so as to cause said calculating means to supply one of said transmission cell rates to said transmission terminal.

2. The buffer controller as set forth in claim 1, in which said calculating means includes a plurality of calculating units respectively having said algorithms so as to independently calculate said transmission cell rates, and said selecting means selectively activates said plurality of calculating units depending upon said current degrees of congestion status.

3. The buffer controller as set forth in claim 2, in which each of said algorithms requires a first piece of control data information representative of a first transmission cell rate to be used for a cell transmission from said cell buffer to a receiving unit and a second piece of control data information representative of a second transmission cell rate to be used for a cell transmission from said transmitting terminal to said cell buffer.

4. The buffer controller as set forth in claim 3, in which said first transmission cell rate is represented by an allowable cell rate internally calculated, and said second transmission cell rate is represented by an explicit rate supplied from said receiving terminal.

5. The buffer controller as set forth in claim 4, in which said allowable cell rate is determined on the basis of said explicit rate, and said explicit rate is supplied from a virtual destination module, and said one of said transmission cell rates is supplied through a virtual source to said transmitting terminal.

6. The buffer controller as set forth in claim 3, in which said first transmission cell rate is represented by an allowable cell rate and an explicit rate stored in a forward resource management cell supplied from said transmitting terminal, and said second transmission cell rate is represented by an explicit rate stored in a backward resource management cell supplied from said receiving terminal.

7. The buffer controller as set forth in claim 6, in which said forward resource management cell and said backward resource management cell are respectively supplied through input processing units forming parts of an asynchronous transfer mode switching unit together with said buffer controller.

8. The buffer controller as set forth in claim 1, in which said judging means checks said at least one queue to see whether or not said length exceeds any one of first thresholds, and determines said current degree of said congestion status when said length exceeds one of said first threshold having the smallest value.

9. The buffer controller as set forth in claim 8, in which said judging means further checks a timer to see whether or not a first lapse of time from an excess of said any one of first thresholds exceeds a second threshold, and instructs said selecting means, to cause said calculating means to change said one of said transmission cell rates to another of said transmission cell rates having a value smaller than a value of said one of said transmission cell rates when said first lapse of time reaches said second threshold.

10. The buffer controller as set forth in claim 9, in which said judging means further checks said at least one queue to see whether or not said length is decreased to any one of said first thresholds, and instructs said selecting means to cause said calculating means to change said one of said transmission cell rates to another of said transmission cell rates having a value greater than a value of said one of said transmission cell rates when said length reaches said any one of said first thresholds.

11. The buffer controller as set forth in claim 9, in which said judging means further checks said at least one queue to see whether or not said length is decreased to any one of said first thresholds and a timer to see whether or not a second lapse of time after the decrease to said any one of said first thresholds reaches a third threshold, and instructs said selecting means to cause said calculating means to change said one of said transmission cell rates to yet another of said transmission cell rates having a value greater than a value of said one of said transmission cell rates.

12. The buffer controller as set forth in claim 10, in which said first thresholds used for the increase of transmission cell rate are respectively different in value than said first thresholds used for the decrease of transmission cell rate.

13. The buffer controller as set forth in claim 9, in which said second threshold is changed in value depending upon said first threshold.

14. The buffer controller as set forth in claim 1, in which said judging means has a first threshold for said length indicative of said congestion status and second thresholds for a lapse of time from excess of said first threshold, and checks to see whether or not said lapse of time reaches any one of said second thresholds so as to determines said current degree of said congestion status.

15. The buffer controller as set forth in claim 14, in which said judging means instructs said selecting means to cause said calculating means to change said one of said transmission cell rates to another of said transmission cell rates having a value less than a value of said one of said transmission cell rates when said lapse of time exceeds one of said second thresholds.

16. The buffer controller as set forth in claim 15, in which said judging means further checks said at least one queue to see whether or not said length is decreased to said first threshold, and instructs said selecting means to cause said calculating means to change said one of said transmission cell rates to another of said transmission cell rates having the least value when said length is decreased to said first threshold.

17. A method of controlling a cell transmission from a transmitting terminal to a receiving terminal both incorporated in an asynchronous transfer mode network for an available bit rate service, comprising the steps of:

a) checking a queue of cells to see whether or not a length of queue is indicative of congestion status;

b) counting a lapse of time after entry into said congestion status;

c) determining a current degree of said congestion status on the basis of said length of said queue and said lapse of time;

d) changing a transmission cell rate to a value appropriate to said current degree of congestion status; and e) notifying said value of said transmission cell rate to said transmitting terminal so as to vary the amount of said cells supplied from said transmitting terminal per unit time.

18. The method as set forth in claim 17, in which said step a) includes the sub-steps of a-1) preparing first thresholds different in value from one another and corresponding to degrees of said congestion status, a-2) comparing said queue with said first thresholds to see whether or not said length of said queue exceeds any one of said first thresholds, and a-3) deciding said asynchronous transfer mode network to be in said congestion status when said length exceeds said any one of said first thresholds.

19. The method as set forth in claim 18, in which, when said length exceeds said any one of said first thresholds, the method proceeds through said step b) to said step c), and said step c) includes the sub-steps of c-1) preparing a second threshold, c-2) comparing said lapse of time with said second threshold to see whether or not said lapse of time reaches said second threshold, and c-3) determining said current degree to be a degree corresponding to said any one of said first thresholds.

20. The method as set forth in claim 19, in which said second threshold is constant to all of said first thresholds.

21. The method as set forth in claim 19, in which said second threshold is varied depending upon said any one of said first thresholds.

22. The method as set forth in claim 17, in which said step a) includes the sub-steps of
- a-1) preparing first thresholds different in value from one another and corresponding to degrees of said congestion status,
- a-2) comparing said queue with said first thresholds to see whether or not said length of said queue is decreased to any one of said first thresholds, and
- a-3) deciding said asynchronous transfer mode network to be on the way recovered from said congestion status when said length is decreased to said any one of said first thresholds.

23. The method as set forth in claim 22, in which, when said length is decreased to said any one of said first thresholds, the method proceeds to said step c) without execution of said step b), and said step c) includes the sub-steps of determining said current degree to be a degree corresponding to said any one of said first thresholds.

24. The method as set forth in claim 22, in which, when said length is decreased to said any one of said first thresholds, the method proceeds to said step c) through said step b), and said step c) includes the sub-steps of
- c-1) preparing a second threshold,
- c-2) comparing said lapse of time with said second threshold to see whether or not said lapse of time reaches said second threshold, and
- c-3) determining said current degree to be a degree corresponding to said any one of said first thresholds.

25. The method as set forth in claim 17, in which said step a) includes the sub-steps of
- a-1) preparing first thresholds different in value from one another and corresponding to degrees of said congestion status,
- a-2) comparing said queue with said first thresholds to see whether said length of said queue exceeds or decreased to any one of said first thresholds, and
- a-3) deciding said asynchronous transfer mode network to be in said congestion status when said length exceeds said any one of said first thresholds and to be on the way recovered from said congestion status when said length is decreased to said any one of said first thresholds.

26. The method as set forth in claim 25, in which said first thresholds on said way recovered from said congestion status are different from said first thresholds while said length is exceeding them.

27. The method as set forth in claim 17, in which said step a) includes the sub-steps of
- a-1) preparing a first threshold,
- a-2) comparing said queue with said first threshold to seen whether said length of said queue exceeds said first threshold, and
- a-3) deciding said asynchronous transfer mode network to be enter into said congestion status when said length exceeds said first threshold.

28. The method as set forth in claim 27, in which, when said length exceeds said first threshold, the method proceeds through said step b) to said step c), and said step c) includes the sub-steps of
- c-1) preparing second thresholds different in value from one another and corresponding to degrees of said congestion status,
- c-2) comparing a lapse of time after entry into said congestion status with said second thresholds to see whether or not said lapse of time is between any adjacent two of said second thresholds, and
- c-3) determining said current degree to be a degree corresponding to one of said adjacent two of said second thresholds.

* * * * *